United States Patent
Han et al.

(10) Patent No.: US 10,779,014 B2
(45) Date of Patent: Sep. 15, 2020

(54) TILE SCHEDULER FOR VIEWPORT-ADAPTIVE PANORAMIC VIDEO STREAMING

(71) Applicants: AT&T Intellectual Property I, L.P., Atlanta, GA (US); The Trustees of Indiana University, Bloomington, IN (US)

(72) Inventors: Bo Han, Bridgewater, NJ (US); Peshala Pahalawatta, Burbank, CA (US); Vijay Gopalakrishnan, Edison, NJ (US); Feng Qian, Minneapolis, MN (US)

(73) Assignees: AT&T Intellectual Property I, L.P., Atlanta, GA (US); The Trustees of Indiana University, Bloomington, IN (US)

( * ) Notice: Subject to any disclaimer, the term of this patent is extended or adjusted under 35 U.S.C. 154(b) by 0 days.

(21) Appl. No.: 16/164,308

(22) Filed: Oct. 18, 2018

(65) Prior Publication Data
US 2020/0128280 A1    Apr. 23, 2020

(51) Int. Cl.
*H04N 19/146* (2014.01)
*H04N 19/37* (2014.01)
(Continued)

(52) U.S. Cl.
CPC ... *H04N 21/21805* (2013.01); *G06F 3/04815* (2013.01); *H04N 5/23238* (2013.01)

(58) Field of Classification Search
CPC ............ A61B 1/00179; A61B 1/00193; A61B 1/00183; H04N 13/282; H04N 5/23296; G02B 23/2415
See application file for complete search history.

(56) References Cited

U.S. PATENT DOCUMENTS 7,747,598 B2 *   6/2010   Buron ................. G06F 16/9537
                                                              707/705
7,792,883 B2 *   9/2010   Buron ................. G06F 16/9537
                                                              707/918
(Continued)

FOREIGN PATENT DOCUMENTS

GB          2550589 A     11/2017
WO      2017134110 A1      8/2017
(Continued)

OTHER PUBLICATIONS

Xiao, et al., "OpTile: Toward Optimal Tiling in 360-degree Video Streaming", In Proceedings of MM '17, Mountain View, CA, USA, Oct. 23-27, 2017,, 9 pages.
(Continued)

*Primary Examiner* — Philip P. Dang
(74) *Attorney, Agent, or Firm* — Guntin & Gust, PLC; Ralph Trementozzi

(57) ABSTRACT

Aspects of the subject disclosure may include, for example, a method including obtaining media content and a ranking for each tile of the media content based on a plurality of viewports; receiving a request from user equipment to view the media content; obtaining, iteratively, a plurality for predicted fields of view of the user, the predicted fields of view each covering different future time periods; identifying viewports corresponding to the predicted fields of view; sending any remaining tiles corresponding to the closest in time predicted field of view to the user equipment; and sending remaining tiles corresponding to successive predicted fields of view to the user equipment the ranking based and an excess bandwidth. Other embodiments are disclosed.

20 Claims, 9 Drawing Sheets

(51) Int. Cl.
  *H04N 21/218* (2011.01)
  *G06F 3/0481* (2013.01)
  *H04N 5/232* (2006.01)

(56) References Cited

U.S. PATENT DOCUMENTS

| | | | | |
|---|---|---|---|---|
| 8,081,827 | B2* | 12/2011 | Gormish | G06K 9/00442 |
| | | | | 345/1.1 |
| 8,384,726 | B1* | 2/2013 | Grabowski | G06T 15/20 |
| | | | | 345/548 |
| 8,463,774 | B1* | 6/2013 | Buron | G06F 16/95 |
| | | | | 707/724 |
| 9,027,067 | B2* | 5/2015 | Michael | H04N 21/23106 |
| | | | | 715/719 |
| 9,383,917 | B2* | 7/2016 | Mouton | G06F 3/04883 |
| 9,514,551 | B2* | 12/2016 | Dewan | G09G 5/393 |
| 10,015,527 | B1 | 7/2018 | Banta et al. | |
| 10,057,570 | B2 | 8/2018 | Ye et al. | |
| 10,062,414 | B1* | 8/2018 | Westphal | H04N 21/23106 |
| 10,225,546 | B2* | 3/2019 | Gupte | H04N 13/178 |
| 10,277,914 | B2* | 4/2019 | Makar | H04N 19/126 |
| 10,424,097 | B2* | 9/2019 | Vembar | H04N 19/436 |
| 10,440,361 | B2* | 10/2019 | Hensler | H04N 19/167 |
| 10,440,416 | B1* | 10/2019 | Phillips | H04N 19/172 |
| 10,499,066 | B2* | 12/2019 | Copley | H04N 19/162 |
| 10,523,914 | B1* | 12/2019 | Phillips | H04N 19/597 |
| 2010/0281402 | A1* | 11/2010 | Staikos | G06F 16/957 |
| | | | | 715/760 |
| 2014/0372419 | A1* | 12/2014 | Li | G06F 16/9038 |
| | | | | 707/723 |
| 2015/0237351 | A1 | 8/2015 | Lee et al. | |
| 2015/0356088 | A1* | 12/2015 | Berkhin | G06F 16/24578 |
| | | | | 707/748 |
| 2016/0196349 | A1* | 7/2016 | Berkhin | G06F 16/29 |
| | | | | 707/706 |
| 2017/0118540 | A1 | 4/2017 | Thomas et al. | |
| 2017/0339415 | A1* | 11/2017 | Wang | H04N 21/84 |
| 2017/0339416 | A1* | 11/2017 | Hendry | H04N 19/167 |
| 2017/0344843 | A1* | 11/2017 | Wang | G06K 9/00744 |
| 2017/0347163 | A1 | 11/2017 | Wang | |
| 2018/0103199 | A1* | 4/2018 | Hendry | H04N 19/61 |
| 2018/0160123 | A1 | 6/2018 | Van Der Auwera et al. | |
| 2018/0160160 | A1* | 6/2018 | Swaminathan | H04L 65/4084 |
| 2018/0176468 | A1* | 6/2018 | Wang | H04N 5/23238 |
| 2018/0199042 | A1 | 7/2018 | Wang et al. | |
| 2018/0255317 | A1 | 9/2018 | Wang | |
| 2018/0261254 | A1 | 9/2018 | Wang et al. | |
| 2018/0288423 | A1* | 10/2018 | Vembar | H04N 19/503 |
| 2018/0376126 | A1* | 12/2018 | Hannuksela | H04N 19/30 |
| 2019/0005986 | A1* | 1/2019 | Peters | H04S 7/303 |
| 2019/0089643 | A1* | 3/2019 | Westphal | H04L 47/283 |
| 2019/0230142 | A1* | 7/2019 | He | H04N 21/44218 |
| 2019/0310472 | A1* | 10/2019 | Schilt | G02B 27/0093 |
| 2019/0356894 | A1* | 11/2019 | Oh | H04N 21/234345 |

FOREIGN PATENT DOCUMENTS

| | | |
|---|---|---|
| WO | 2017210444 A1 | 12/2017 |
| WO | 2018050606 A1 | 3/2018 |
| WO | 2018057472 A1 | 3/2018 |
| WO | 2018069412 A1 | 4/2018 |
| WO | 2018128071 A1 | 7/2018 |
| WO | 2018136301 A1 | 7/2018 |

OTHER PUBLICATIONS

Xiao, Mengbai et al., "BAS-360: Exploring Spatial and Temporal Adaptability in 360-Degree Videos Over HTTP/2", INFOCOM, 2018., 2018, 9 pages.

* cited by examiner

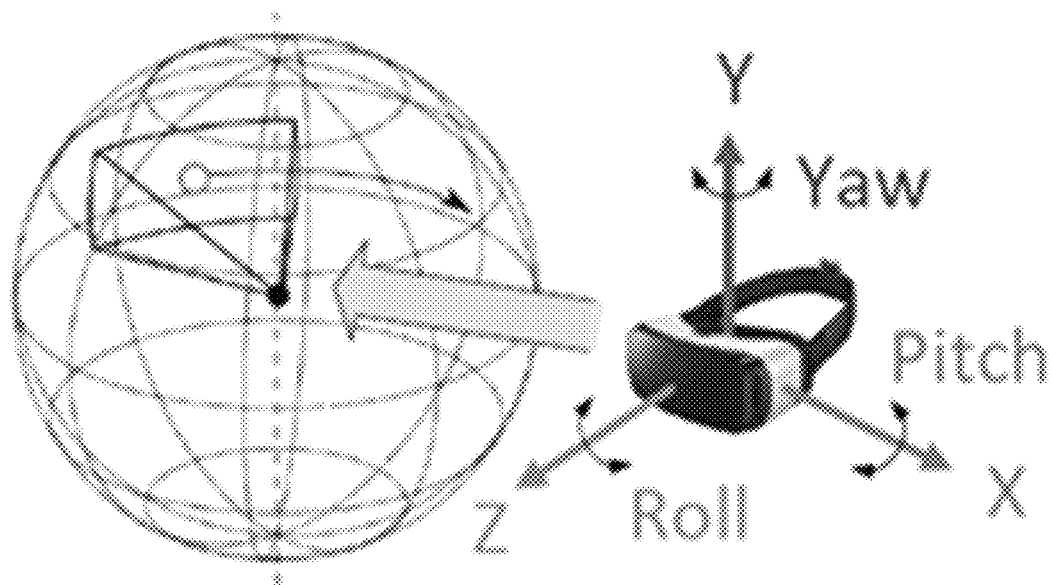
FIG. 1
FIG. 2
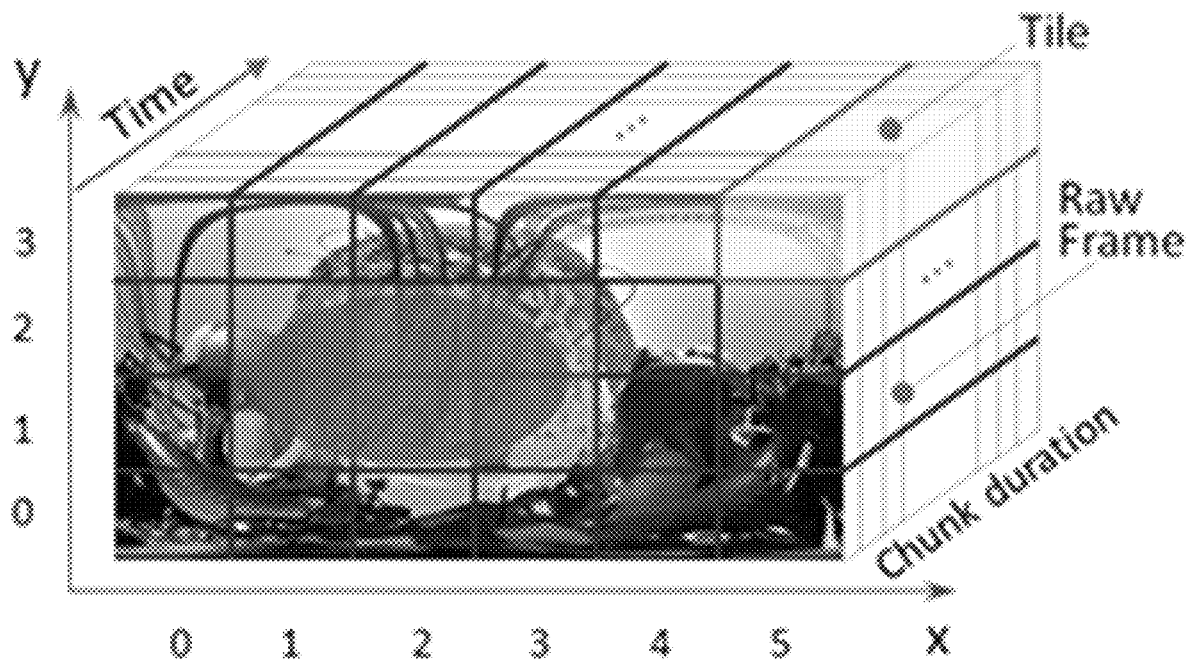

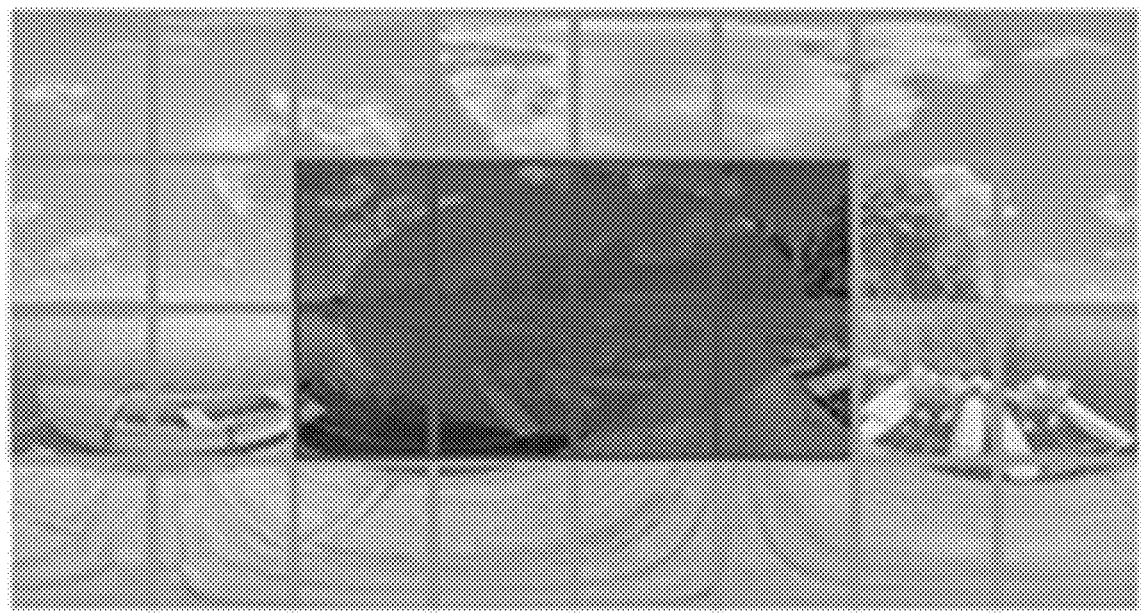
FIG. 3
FIG. 5
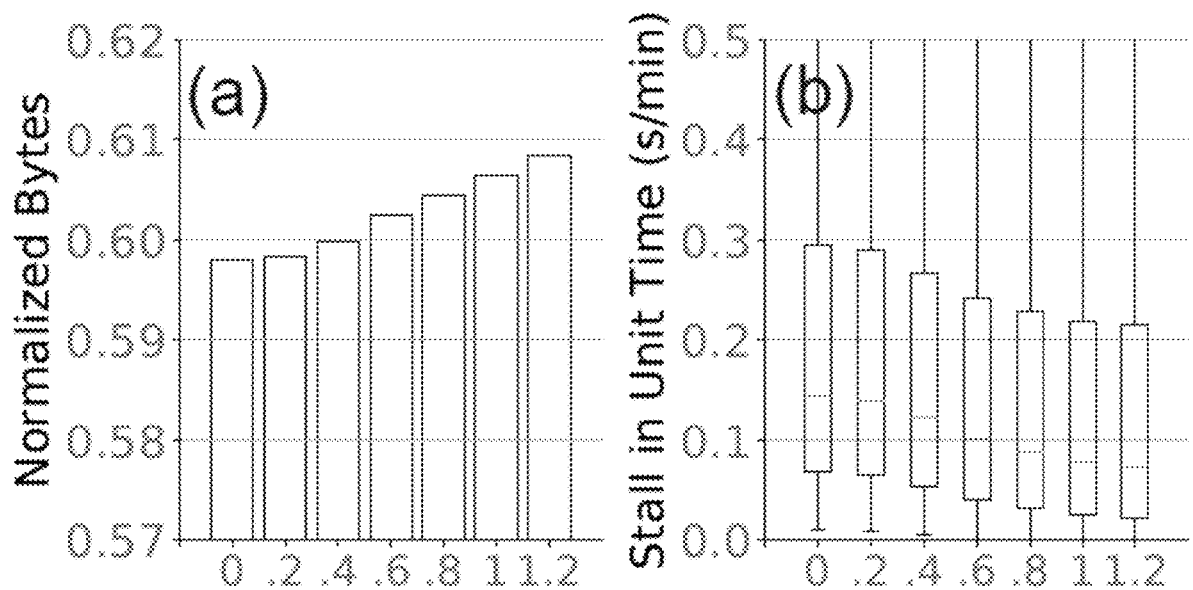

TILE SCHEDULER FOR VIEWPORT-ADAPTIVE PANORAMIC VIDEO STREAMING

FIELD OF THE DISCLOSURE

The subject disclosure relates to a tile scheduler for viewport-adaptive panoramic video streaming.

BACKGROUND

Panoramic video, also known as 360-degree or immersive video, is becoming increasingly popular. In a typical panoramic video system, a user wearing a Virtual Reality (VR) headset can freely change his or her viewing direction. The user is often situated in the center of a virtual sphere, and the panoramic contents downloaded from video servers are projected onto the sphere (such as using Equirectangular projection). The user's viewport (or visible area) is determined by his or her viewing direction (such as in latitude/longitude) and the Field of View (FoV) of the VR headset in real time. The FoV defines the extent of the observable area, which is usually a fixed parameter of a VR headset. As shown in FIG. 1, the user wearing a VR headset can adjust his or her orientation by changing the pitch, yaw, and roll, which correspond to rotating along the X, Y, and Z axes, respectively.

BRIEF DESCRIPTION OF THE DRAWINGS

Reference will now be made to the accompanying drawings, which are not necessarily drawn to scale, and wherein:

FIG. 1 is a diagram illustrating three axes within 360 degree video.

FIG. 2 is a diagram illustrating 360 degree video being divided into tiles, each tile defining an area for a time period.

FIG. 3 is a diagram illustrating a viewport within 360 degree video.

FIG. 5 illustrates the impact of aggressiveness on fetching out-of-sight tiles within 360 degree video in accordance with various aspects described herein.

DETAILED DESCRIPTION

Figure 4:
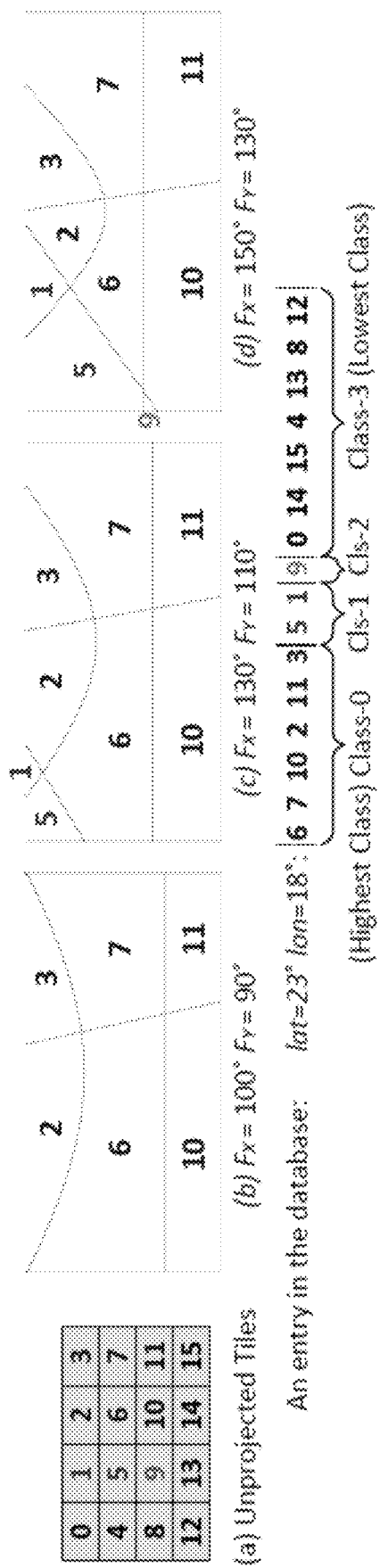
FIG. 4 depicts a series of charts illustrating an exemplary ranking of tiles based on a viewport in accordance with various aspects described herein.

The subject disclosure describes, among other things, illustrative embodiments for ranking/scheduling tiles for video streaming. Other embodiments are described in the subject disclosure.

One or more aspects of the subject disclosure include a method comprising: obtaining media content, the media content being divided into a plurality of tiles, each tile defining an area of a plurality of areas of the media content for a first time period of a plurality of time periods of the media content; obtaining a ranking for each tile based on a plurality of viewports; receiving a request from equipment of a user to view the media content; obtaining, at a first point in time, a first predicted field of view of the user at a second point in time and a second predicted field of view of the user at a third point in time, wherein the second point in time is after the first point in time and the third point in time is after the second point in time; identifying a first viewport of the plurality of viewports corresponding to the second predicted field of view; sending one or more remaining tiles corresponding to the first predicted field of view to the equipment of the user; and sending one or more tiles corresponding to the second predicted field of view to the equipment of the user according to the ranking based on the first viewport and a first excess bandwidth, the first excess bandwidth remaining after sending the one or more tiles corresponding to the first predicted field of view.

Portions of the method may be performed iteratively and/or more predicted fields of view may be obtained each iteration. For example, the multiple predicted fields of view may be obtained periodically according to a second time period less than the first time period. The predicted fields of view may be obtained from the equipment of the user or determined by a system performing the method, in which case they may be based on information received from the equipment of the user. Likewise, the rankings may be determined by a system performing the method or received from a source of the content. Each tile covers the first time period, the predicted fields of view may be obtained periodically according to the second time period (which may or may not be shorter than the first time period), and the predicted fields of view cover a third time period (which may or may not be shorter than the first and/or second time period).

One or more aspects of the subject disclosure include a machine-readable storage medium, comprising executable instructions that, when executed by a processing system including a first processor, facilitate performance of operations, the operations comprising: obtaining media content from a content source, the media content being divided into a plurality of tiles, each tile defining an area of a plurality of areas of the media content for a first time period of a plurality of time periods of the media content; obtaining a ranking for each tile based on a plurality of viewports, each of the plurality of viewports corresponding to a different one of a plurality of fields of view; receiving a request from equipment of a user to view the media content; obtaining, at a first point in time, a first predicted field of view of the user at a second point in time and a second predicted field of view of the user at a third point in time, wherein the second point in time is after the first point in time and the third point in time is after the second point in time; identifying a first viewport of the plurality of viewports corresponding to the second predicted field of view; sending one or more tiles corresponding to the first predicted field of view to the equipment of the user; and sending one or more tiles corresponding to the second predicted field of view to the equipment of the user according to the ranking based on the first viewport and a first excess bandwidth, the first excess bandwidth remaining after sending the one or more tiles corresponding to the first predicted field of view.

Portions of the operations may be performed iteratively and/or more predicted fields of view may be obtained each iteration. For example, the multiple predicted fields of view may be obtained periodically according to a second time period less than the first time period. The predicted fields of view may be obtained from the equipment of the user or determined by the processing system, in which case they may be based on information received from the equipment of the user. Likewise, the rankings may be determined by the processing system or received from a source of the content. Each tile covers the first time period, the predicted fields of view may be obtained periodically according to the second time period (which may or may not be shorter than the first time period), and the predicted fields of view cover a third time period (which may or may not be shorter than the first and/or second time period).

One or more aspects of the subject disclosure include a computing device, comprising: a processing system including a processor; and a memory that stores executable instructions that, when executed by the processing system, facilitate performance of operations, the operations comprising: obtaining media content, the media content being divided into a plurality of tiles, each tile defining an area of a plurality of areas of the media content for a first time period of a plurality of time periods of the media content; obtaining a ranking for each tile based on a plurality of viewports, each of the plurality of viewports corresponding to a different one of a plurality of fields of view; receiving a request from equipment of a user to view the media content; obtaining, at a first point in time, a first predicted field of view of the user at a second point in time and a second predicted field of view of the user at a third point in time, wherein the second point in time is after the first point in time and the third point in time is after the second point in time; identifying a first viewport of the plurality of viewports corresponding to the second predicted field of view; sending one or more tiles corresponding to the first predicted field of view to the equipment of the user; and sending one or more tiles corresponding to the second predicted field of view to the equipment of the user according to the ranking based on the first viewport and a first excess bandwidth, the first excess bandwidth remaining after sending the one or more tiles corresponding to the first predicted field of view.

Portions of the operations may be performed iteratively and/or more predicted fields of view may be obtained each iteration. For example, the multiple predicted fields of view may be obtained periodically according to a second time period less than the first time period. The predicted fields of view may be obtained from the equipment of the user or determined by the computing device, in which case they may be based on information received from the equipment of the user. Likewise, the rankings may be determined by the computing device or received from a source of the content. Each tile covers the first time period, the predicted fields of view may be obtained periodically according to the second time period (which may or may not be shorter than the first time period), and the predicted fields of view cover a third time period (which may or may not be shorter than the first and/or second time period).

Maintaining good Quality of Experience (QoE) for panoramic or 360-degree videos over bandwidth-limited links on commodity mobile devices remains challenging. First, 360-degree videos are large: under the same perceived quality, 360-degree videos have around 5× larger sizes than conventional videos. Second, 360-degree videos are complex: sophisticated projection and content representation schemes may incur high overhead. For example, some projection algorithms require servers to maintain as many as 88 versions of the same video. Third, 360-degree videos are still under-explored: there is a lack of real-world experimental studies of key aspects such as rate adaptation, QoE metrics, and cross-layer interactions (e.g., with TCP and web protocols such as HTTP/2).

We can divide existing work on 360-degree video streaming into two categories, monolithic streaming and tile-based streaming. A simple monolithic streaming delivers uniformly encoded panoramic views. For more advanced schemes that perform viewport adaptation, a 360-degree video has multiple versions each having a different scene region, called Quality Emphasized Region (QER), with a high encoding rate. A player picks the right version based on the view's head orientation. One practical issue of this scheme is that it incurs significant overhead at the server side.

For the tiling scheme, we spatially segment a 360-degree video into tiles and deliver only tiles overlapping with predicted FoVs for viewport-adaptive video streaming. To increase the robustness, a player can also fetch the rest at lower qualities. Each 360-degree video chunk is pre-segmented into multiple smaller chunks, which are called tiles. The easiest way to generate the tiles is to evenly divide a chunk containing projected raw frames into mxn rectangles each corresponding to a tile. Suppose the projected visible area is ⊕. The client only requests for the tiles that overlap with ⊕. We show an example in FIG. 2 where m=6 and n=4, and ⊕ is the oval region. An original video chunk is segmented into tiles. A tile has the same duration and number of frames as the chunk it belongs to, but occupies only a small spatial portion. Each tile can be independently downloaded and decoded. The client will only request for the six tiles ($1 \leq x \leq 3$, $1 \leq y \leq 2$) overlapping with ⊕. Note that due to projection, despite the viewer's FoV being fixed, the size of ⊕ and thus the number of requested tiles may vary. Compared to FoV-agnostic approaches, tiling offers significant bandwidth saving. Note that the tiling scheme can be applied to not only videos using Equirectangular projection, but also those with Cube Map and/or other projections.

Although tiling based streaming requires minimal changes on the server side, it imposes additional load at the client, which needs to determine to-be-fetched tiles and then decode and stitch them together for display. FoV prediction heavily depends on the head movement of viewers. Due to human users' randomness, prediction errors are inevitable. We note that the head movement predictability may highly rely on the video content. For example, a roller coaster video may have a higher predictability than a NASA Mars video because the former has a clearer "focal point" (such as the rail of the roller coaster) than the latter.

We can tolerate prediction errors by conservatively fetching more tiles covering a larger area than the viewport. For example, some schemes fetch all tiles overlapping with the user's current viewport using the highest possible quality level, as shown in FIG. 3. It also downloads all other tiles, which we call out-of-sight (OOS) tiles (as they are not currently in the user's FoV), using the lowest available quality level, since the likelihood that the viewer will watch a far-away OOS is low. In case that happens, having a low-quality tile will at least ensure the smooth playback without stalling the video.

In theory, the above approach can reduce the stall time by increasing the robustness of streaming. However, in practice the decoding capability of modern mobile devices is limited by the GPU-based hardware video decoders available on them. For example, there are only 13 hardware decoders available on a Google Nexus 5X smartphone with both Android 7.0 and 7.1.1 operating systems. There are 16 hardware decoders for Samsung Galaxy S7 and S7 Edge smartphones with Android 6.0.1 operating system. For the 4×8 segmentation scheme in FIG. 2 and FIG. 3, the player will have to decode 32 tiles concurrently. Thus, it is challenging for mobile devices to decode a large number of tiles when required and guarantee the quality of user experience.

We have built a tile-based player for 360-degree video streaming and tested the performance on Samsung Galaxy S8. When using the 4×6 segmentation and a Full Delivery scheme, such as that presented above, the stall time could be higher than 70 seconds for a video with only 117-second duration. Clearly, if the viewer's head movement is perfectly known beforehand, then the required tiles can be calculated deterministically. In reality, however, they can be only estimated from the imperfect viewport prediction. Since the head movement keeps changing, a viewport-adaptive player needs to continuously perform viewport prediction. Thus, it is helpful to determine the appropriate set of tiles that need to be downloaded for viewport-adaptive 360-degree video streaming.

Calculating the Tile Set. Assume that at time $T_0$, viewport prediction is invoked to update a to-be-fetched tile list. Instead of performing a single prediction, one or more exemplary embodiments can conduct multiple predictions for time $t=T_0+\delta_T, T_0+2\delta_T, \ldots, T_0+m\delta_T$, in order to construct the trajectory of the user's future viewports. In other words, when invoked at $T_0$, the viewport prediction module outputs m tuples $(t_i, \varphi_i, \lambda_i)$ each indicating the predicted lat/lon at time $t_i=T_0+i\delta_T$. The tile scheduler then translates each tuple into a tile set, whose chunk number is determined by the floor of $t_i/d$ (d is the chunk duration). Its tile numbers are determined by $(\varphi_i, \lambda_i)$ and the viewport-to-tile mappings (which may be pre-generated based on the projection algorithm, as exemplified in FIG. 4). Finally, the set of tiles to be fetched consists of the union of all predicted tile sets across all m predictions (excluding those already received). Regarding selecting m and $\delta_T$, ideally m should be large and δ be small. In one embodiment, considering the system overhead and the difficulty of viewport prediction in the long term, we can pick $\delta_T=100$ ms and m=30 (which means to 30 predictions, each covering 100 ms). In at least one embodiment, these 30 predictions, each covering 100 ms, are performed every 10 ms.

Tolerating Inaccurate Viewport Prediction. The above procedure selects all tiles that fall into any viewport along the predicted trajectory. But doing so may not be sufficient because viewport prediction may make errors. Thus, some embodiments employ any (or a combination) of three mechanisms to tolerate inaccurate viewport prediction. A first mechanism is naturally provided by the tiles themselves: since a tile must be fetched as long as any of its frames intersects with any predicted viewport, oftentimes only a small portion of a fetched tile is consumed. This wastes some bandwidth but helps absorb inaccurate viewport prediction as long as the error does not cross a tile.

A second mechanism dealing with inaccurate viewport prediction is to fetch additional OOS tiles that are not in the originally predicted tile set. For example, we can assume that for each viewport in the predicted trajectory, all tiles (including those not in the viewport) are ranked by their "perceptive importance". Intuitively, tiles that fully appear inside the viewport are ranked the highest, followed by tiles that partially overlap with the viewport, then tiles near the viewport, and finally "far-away" tiles that may be in the opposite direction of the viewport. For a given viewport v, one or more exemplary embodiments can fetch its k tiles with the highest ranks. k may be calculated as follows:

$$k(v)=c_0(v)+\lceil \varepsilon(1-S)(n-c_0(v)) \rceil \quad (1)$$

where $c_0(v)$ is the number of tiles that overlap with the viewport. $k(v)$ should be at least $c_0(v)$, otherwise the user's view becomes incomplete at v. For the remaining $n-c_0(v)$ OOS tiles where n is the total number of tiles per chunk, we fetch the top $\varepsilon(1-S)$ fraction of them, again based on the tiles' ranks. $\varepsilon$ is a parameter controlling the aggressiveness of fetching OOS tiles; $S \in [0, 1]$ quantifies the recent viewport-prediction accuracy. Intuitively, the second part in Eq. (1) adjusts the number of OOS tiles to be fetched adaptively based on S: if the recent viewport prediction becomes accurate (or inaccurate), then less (or more) OOS tiles will be scheduled for fetching. S is computed as the Exponentially Weighted Moving Average (EWMA) of the viewport prediction accuracy defined as $J(L_p, L_c)$. $J()$ is the Jaccard Index (a metric measuring set similarity); $L_c$ is the actually consumed tile set for the current frame, and $L_p$ is its prediction conducted moments before (e.g., we can use a prediction 200 ms ago).

$$S \leftarrow \alpha J(L_p, L_c)+(1-\alpha)S \quad (2)$$

A third mechanism tackling the imperfect viewport prediction is to let an earlier inaccurate prediction be fixed by a more recent prediction that is more accurate.

Ranking the Tiles. We now describe given a viewport ($\varphi$, $\lambda$, $F_x$, $F_y$), where $\varphi$, $\lambda$ defines the viewing direction and $F_x$, $F_y$ defines the field of view, how all tiles can be ranked based on their "perceptive importance". Recall the ranks are used in selecting OOS tiles, and it will also be used in rate adaptation. We begin with tiles that overlap with the viewport. We call them Class-0 tiles, and rank them according to their visible areas in the viewport. For example, FIG. 4(a) plots a 4×4 tile segmentation configuration. FIG. 4(b) shows the tiles that a user sees when looking at $\varphi=23°$, $\lambda=18°$ with $F_x=100°$ and $F_y=90°$. Tile #6 ranks the highest because it occupies the largest area, followed by Tile #7, and so on. To rank the remaining OOS tiles, we expand the FoV by increasing $F_x$ and $F_y$ ($\varphi$ and $\lambda$ remain the same). Then additional tiles (e.g., Tiles #5 and #1 in FIG. 4(c)) may become visible. We call these new tiles Class-1 tiles, and also rank them according to their areas in the extended viewport. We then use the same approach of extending the viewport to rank tiles in lower classes (Class-2 and so on). For all remaining tiles, they belong to the lowest class and are ranked by the spherical distance between their centroid and the center of the viewport. Intuitively, the above procedure creates a total order relation on the overall tile set for each viewport. Also, it is important to note that the whole ranking process is performed offline and cached in a database for runtime use, as exemplified in FIG. 4.

Another interesting observation from FIG. 4 is that after the projection, the projected area of these equal sized rectangular tiles could be quite different. For example, tiles close to the central of the viewport are typically larger than those at the boundary. Moreover, for some tiles only a (small) portion of them will be displayed to viewers. The unequal projected area leads to the opportunity of applying different resolution to these tiles based on the size of their projected area. Some embodiments use a simple policy to determine the resolution of fetched tiles based on their projected area. The benefit of this proposal is that it can improve the bandwidth efficiency by downloading tiles with small projected area with a low resolution, without affecting the user's QoE. Suppose the highest available resolution is 8K. For tiles overlapping with a viewport, the largest projected area is PM. For tiles with projected area not smaller than PM/4, we will use the same 8K resolution for them. For tiles with projected area smaller than PM/4 but larger than PM/16, we will use the 4K resolution. The rest tiles will use the 2K resolution. The rationale behind this policy is that the size of 4K resolution is around ¼ of that of 8K resolution.

Note that in a practical implementation of the above method of resolution reduction, it may not be possible to dynamically change the actual pixel resolution of a subset of tiles provided to a hardware decoder while keeping other tiles at a higher resolution. In a typical video codec, tiles are defined as rectangular segments of the encoded image, and the decoded pixel resolution of the tiles should match the size of the rectangular segment. In that case, we propose to reduce the "effective" resolution of the tiles by pre-filtering the images corresponding to the tiles using a low-pass filter prior to encoding them. The pre-filtering would allow the low priority tiles to be encoded at lower bitrates than the high priority tiles without causing compression related visual artifacts. In a further embodiment, the pre-filter parameters may be applied as a function of the required effective resolution of the tile. The pre-filtering may be applied using a separable filter with different filtering strengths applied to horizontal and vertical directions depending on the proportion of horizontal and vertical pixels from the tile that would be visible in the viewport.

Putting Everything Together. The following steps may be performed on a per-frame basis to adapt to the viewer's continuous head movement. (1) Compute the Jaccard Index and use that to update S (Eq. 2) and henceforth k(v) (Eq. 1). (2) Perform viewport prediction for m future timestamps $\{t_i=T_0+i\ \delta_T\}$. (3) For each $t_i$, perform the database lookup using its predicted lat/lon as the key; select the ordered sublist containing the first k(v) tiles from the database entry. (4) Merge the sublists across $\{t_i\}$ into the final (ordered) list containing the tiles to fetch. In the merged list, tiles are sorted by their predicted occurrence time (the primary key) and their ranks as calculated in FIG. 4 (the secondary key). For example, if tile 1 becomes a Class-0 tile later on for another frame in the same chunk, the final Class-0 tile set will be {6, 7, 10, 2, 11, 3, 1}. (5) Pass this merged list to the rate adaptation algorithm.

We implement a trace-driven simulator to evaluate the impact of various parameters on the performance of viewport-adaptive 360-degree video streaming. For example, FIG. 5 studies the impact of ε. As shown in this FIG. 5 (a), increasing E causes slight inflation of bandwidth consumption due to the additionally downloaded OOS tiles; on the positive side, doing so helps reduce the stall duration, which is demonstrated in FIG. 5(b).

Exemplary Embodiment. A 360-degree video may be divided into individual tiles, each defined by a view area (X×Y) and a duration. For example, for any point in time, a FoV will comprise several tiles covering and/or overlapping that FoV's view area. If the FoV is held constant over time, the view area doesn't change, but successive sets (based on time) of those same tiles covering or overlapping that FoV's view area need to be retrieved. As the FoV changes over time, successive, slightly different sets of tiles covering and/or overlapping the FoV need to be retrieved. This leads to the need to retrieve a lot of tiles. Of course, retrieving all of the tiles in a 360-degree video leads to wasted bandwidth, as a viewer/user only sees one FoV at any point in time.

We propose an iterative prioritization scheme to prioritize retrieval of the tiles needed to maximize QoE while minimizing wasted bandwidth. To aid in this, the system may maintain an offline database with rankings for each tile based on every possible viewport, or FoV prediction. For each FoV prediction, tiles within or overlapping that FoV are ranked the highest, with adjacent tiles having the second highest rank, and so on.

Software on a display device, such as a VR headset or mobile device, iteratively provides a server with a FoV prediction. In another embodiment, the display device continuously or iteratively, provides the server with an actual FoV, from which the server predicts future FoVs. In either case, the FoV predictions may be iteratively determined. For example: @T1, we get FoV predictions for T2, T3, T4, T5, etc.; @T2, we get FoV predictions for T3, T4, T5, T6, etc.; and @T3, we get FoV predictions for T4, T5, T6, T7, etc. In one embodiment, the system makes 30 FoV predictions every 10 ms, with the predictions covering 100 ms.

With each prediction, the server re-prioritizes the tiles that need to be sent to the display device. For example, at T1, the server sends the display device whatever tiles it needs for T2, based on the FoV prediction performed at T1. If there is remaining bandwidth, the server sends the display device tiles for T3 (based on the FoV prediction performed at T1) according to the ranking, i.e. highest ranking tiles first.

At T2, the server sends the display device whatever tiles it needs for T3, based on the FoV prediction performed at T2. If there is remaining bandwidth, the server sends the display device tiles for T4 (based on the FoV prediction performed at T2) according to the ranking, i.e. highest ranking tiles first. If there is remaining bandwidth, after sending all of the T4 tiles, the server sends the display device tiles for T5 (based on the FoV prediction performed at T2) according to the ranking, i.e. highest ranking tiles first.

For example, let's assume each FoV needs 10 tiles, bandwidth capacity is constant at 12 tiles, and the display device's buffer is empty at T1. With that in mind:

At T1, the server sends the display device the 10 tiles needed for T2, based on the FoV prediction performed at T1 and the 2 highest ranking tiles for T3 (based on the FoV prediction performed at T1).

At T2, assuming the T2 FoV prediction is the same as the T1 FoV prediction, the server sends the display device the remaining 8 tiles for T3 and the 4 highest ranking tiles for T4 (based on the FoV prediction performed at T2).

If the T2 FoV prediction is not the same as the T1 FoV prediction, at T2, the server may need to send 9 or even all 10 T3 tiles, based on the FoV prediction performed at T2. If there is remaining bandwidth, the server sends the display device tiles for T4 (based on the FoV prediction performed at T2) according to the ranking, i.e. highest ranking tiles first. If there is remaining bandwidth, after sending all of the T4 tiles, the server sends the display device tiles for T5 (based on the FoV prediction performed at T2) according to the ranking, i.e. highest ranking tiles first.

Of course, bandwidth capacity is often not constant, and thus the system's ability to send tiles for future viewing is likely constantly changing. In other words, any excess bandwidth remaining after sending the tile(s) corresponding to the predicted FoV for the future time period(s) is likely constantly changing.

Additionally, remember that each tile is good for a duration. That duration (time period) may or may not be longer than the duration (time period) of each predicted FoV and/or the iterative period with which the process is performed. For example, suppose each tile is good for a 1 second duration. With the process being performed every 10 ms, each tile may (or may not—based on predictions) be good for 100 predictions, as a simplified example (keeping in mind that each time the process is performed multiple predictions are generated). So, at T51, the server sends the display device whatever tiles it needs for T52, based on the FoV prediction performed at T51. Because each tile is good for a duration longer than the iterative period, the display device may not need any tiles for T52 (such as where all those tiles were previously send during T1-T50). The better the predictions, the more likely the display device may not need any tiles for T52. In any case, at T51, the server sends the display device whatever tiles it needs for T52, and then the T53 tiles based on ranking, then the T54 tiles based on ranking, etc., all based on the FoV prediction performed at T51.

Figure 6:
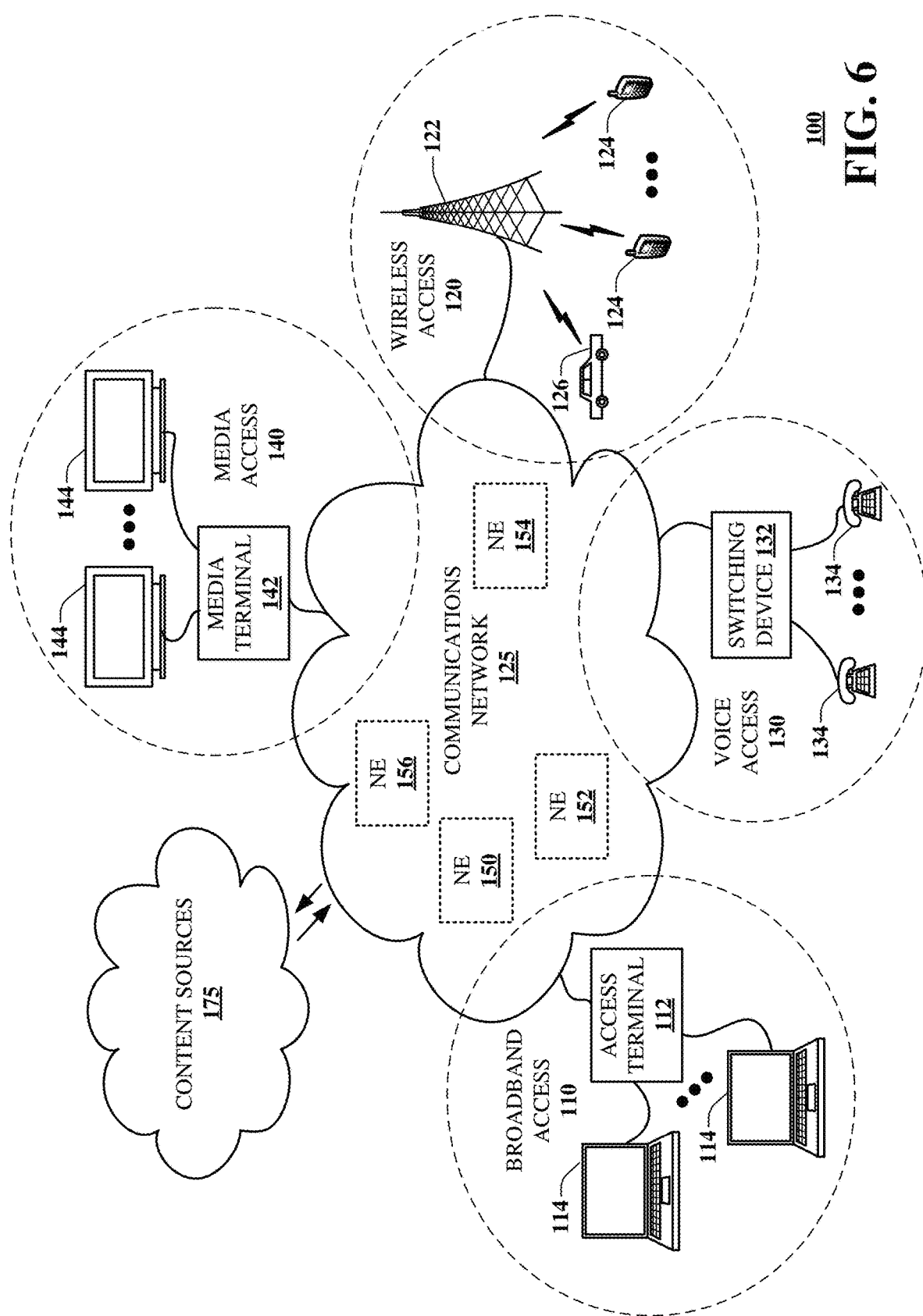
FIG. 6 is a block diagram illustrating an exemplary, non-limiting embodiment of a communications network in accordance with various aspects described herein.

Referring now to FIG. 6, a block diagram is shown illustrating an example, non-limiting embodiment of a communications network 100 in accordance with various aspects described herein. For example, communications network 100 can facilitate in whole or in part video streaming as described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 7:
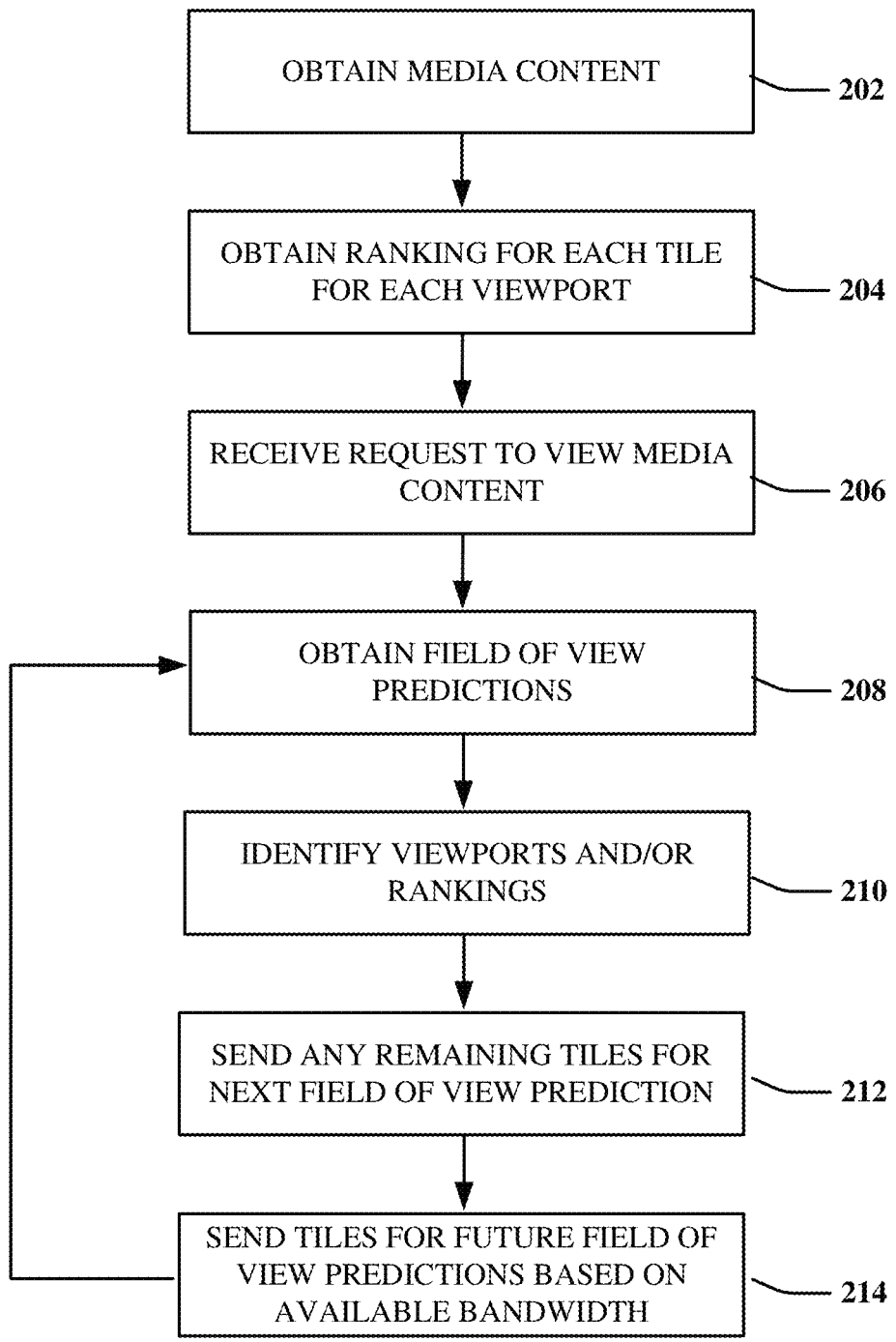
FIG. 7 depicts an illustrative embodiment of a method in accordance with various aspects described herein.

FIG. 7 depicts an illustrative embodiment of a method 200 in accordance with various aspects described herein. As shown in 202, the method 200 may begin by a server or system of servers (hereinafter "system") on the communications network 125 obtaining media content, such as 360-degree, panoramic video, immersive video, VR video, etc. The media content may be obtained from any number of sources, such as the content source 175 for example. The media content may be divided into a plurality of tiles. Each tile may define (or be defined by) an area within the media content for a time period of a plurality of time periods of the media content. In other words, at any given time, there are a plurality of tiles each covering a specific area of the media content for that time. For any given area, there are a plurality of tiles each covering a specific time period of the media content for that area.

As shown in 204, the system also obtains a ranking for each tile for each of a plurality of viewports. Each viewport represents a different possible FoV for a user/viewer. There are many possible viewports in each 360 degree video. Each viewport implicates a different ranking for each tile. For example, as discussed above, those tiles that cover or overlap a viewport are ranked the highest for that viewport. The surrounding tiles are ranked the next highest for that same viewport. But, any specific tile may have different rankings for different viewports. For example, a tile at the center of a first viewport (and therefore having the highest ranking for that first viewport) may be completely OOS of a second viewport (and therefore having the lowest ranking for that second viewport). In any case, the system may determine the ranking itself or may obtain the ranking for another component, such as the content source 175. The rankings may be obtained and/or stored with the media content.

As shown in 206, the system receives a request to view the media content from equipment of the viewer/user. The user equipment (UE) may include any of the access terminal 112, the data terminals 114, the mobile devices 124, the vehicle 126, the media terminal 142, the media terminal 142, a VR headset, and/or any other equipment the user may use to request and/or consume the media content.

As shown in 208, the system then obtains a plurality of FoV predictions. The system may obtain these FoV predictions from the content server, with the media content, or from some other source on the network 125. For example, in one embodiment, the UE provides the FoV predictions to the system. In another embodiment, the UE merely provides information indicative of the orientation of the UE, from which the system may determine the FoV predictions. The FoV predictions may account for specific information known about the media content and/or the user themselves, regardless of where (or by what component) the FoV predictions are determined. For example, the FoV predictions may account for past user interaction with the media content, i.e. where did other users look in the media content. The FoV predictions may account for the user themselves, i.e. where are they likely to look given their demographics, preferences, and/or other information known about the user. The FoV predictions may account for both the media content and the user, i.e. where did previous users, who are similar to the current user, look in the media content.

As discussed above, for each iteration of obtaining FoV predictions, the system obtains a plurality of FoV predictions, each spaced out over time. For example, in at least one embodiment, the system obtains 30 FoV predictions each iteration, with each FoV prediction covering 100 ms, thus obtaining FoV predictions covering the next 3 seconds. As discussed elsewhere, in at least one embodiment, the system does this every 10 ms. Thus, the FoV predictions from one iteration overlap with the FoV predictions from successive iterations.

Of course, other time periods and numbers of predictions can be utilized. For example, the system may obtain 5, 10, 20, 40, or 50 FoV predictions each iteration, or some other number between 2 and 50. More FoV predictions are possible in systems with especially powerful processing capabilities. On the other hand, lesser powerful systems may lean toward fewer FoV predictions. Similarly, each FoV prediction may cover anywhere between 10 ms and 1 second. Finally, the system may iteratively obtain the FoV predictions this every 1, 5, 10, 20, 30, or 50 ms, or based on any period between 1 and 50 ms. Again, those systems with better processing power may perform the functions more frequently, while lesser systems may perform the functions less frequently.

As shown in 210, the system may then match the FoV predictions to the viewports and thereby retrieve the rankings for each tile. As discussed above, those tiles within and/or overlapping a viewport have the highest ranking for that viewport, with adjacent tiles having the next highest ranking for that viewport. Then, the rankings are compiled for the various FoV predictions, and tiles are scheduled to be sent to the UE based on the current rankings. The rankings may account for distance in time. For example, tiles within a viewport for a near in time FoV prediction may have a higher rank than tiles also within a viewport for a further in time FoV prediction, for a given iteration. Further, tiles adjacent a viewport for a near in time FoV prediction may have a higher rank than tiles within a viewport for a further in time FoV prediction, for a given iteration. Indeed, tiles OOS of a viewport for a near in time FoV prediction may have a higher rank than tiles within a viewport for a very distant in time FoV prediction, for a given iteration, especially where distant FoV predictions are not closely matching the user's actual FoV.

As shown in 212, those tiles that are needed for presentation at the UE based on the closest in time FoV prediction, having the highest ranking and that have not already been sent to the UE, are sent to the UE. Then, those tiles that are needed for presentation at the UE based on the closest in time FoV prediction, having the next highest ranking and that have not already been sent to the UE, are sent to the UE, and so on until any remaining tiles needed for presentation at the UE based on the closest in time FoV prediction, have been sent to the UE. In some embodiments, this may include only those tiles within or overlapping the FoV prediction or viewport. In some embodiments, this may include those tiles adjacent the FoV prediction or viewport. In some embodiments, this may include OOS tiles. As discussed above, it is anticipated that the UE may already have all tiles needed for the closest in time FoV prediction, with those tiles having been previously sent based on previous FoV predictions. In that case, this step may be skipped.

As shown in 214, the system may utilize any excess or remaining bandwidth (after all the tiles needed for the closest in time FoV prediction have been sent) to get ahead by sending tiles needed for subsequent FoV predictions, based on the rankings of tiles according to the viewports corresponding to those FoV predictions. Thus, the system may accommodate changing network conditions by sending high ranking tiles (ones that are highly anticipated to be needed) before they are actually needed. Furthermore, as the system gets ahead of actual needs, especially where predicted FoVs match actual FoVs, the system may throttle back thereby conserving system resources. As discussed above, the above processes may be repeated iteratively throughout playback of the media content.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
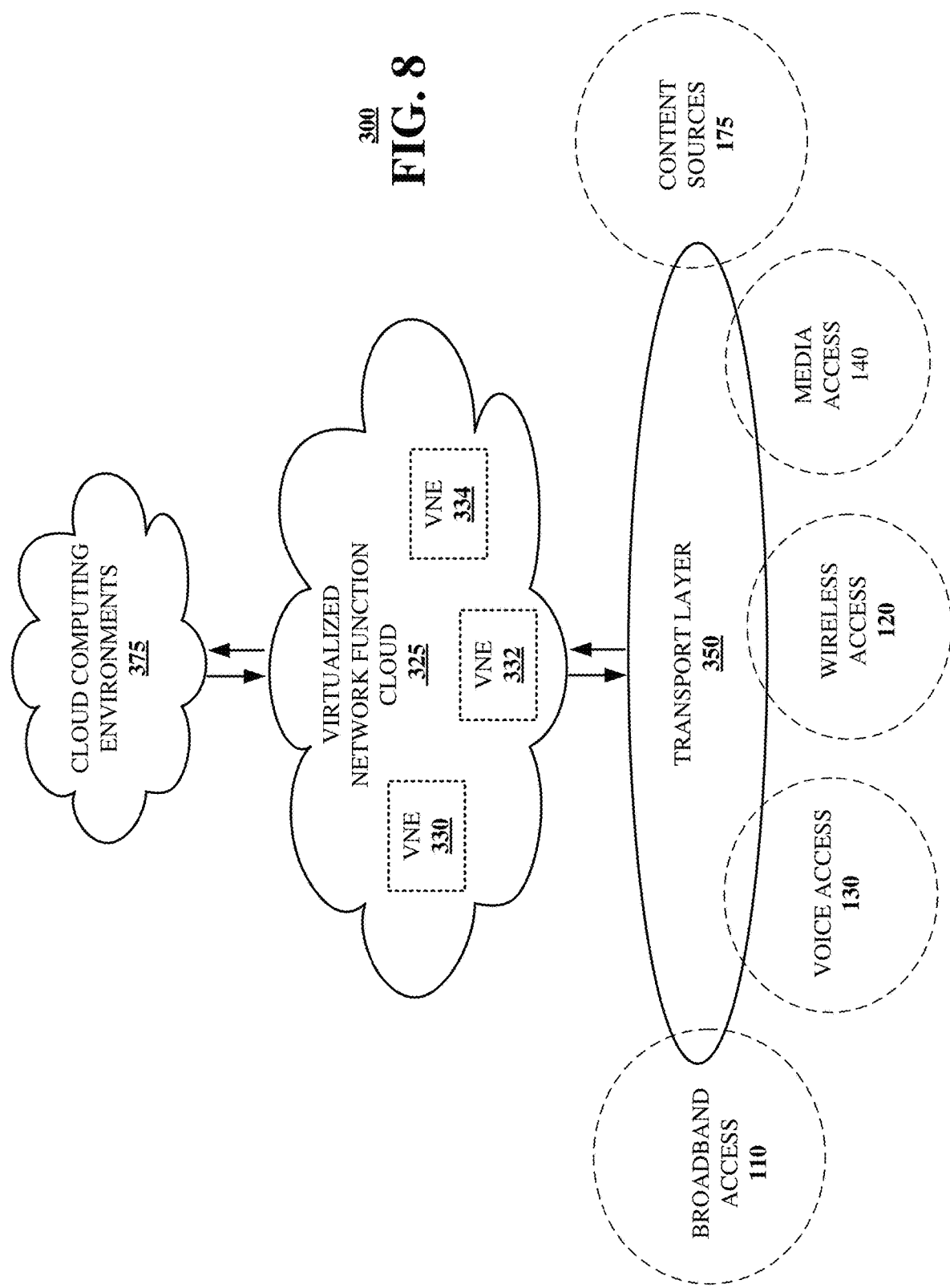
FIG. 8 is a block diagram illustrating an example, non-limiting embodiment of a virtualized communication network in accordance with various aspects described herein.

Referring now to FIG. 8, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of method 200, as well as a system performing the method 200, presented in FIGS. 6, 7, and 8. For example, virtualized communication network 300 can facilitate in whole or in part video streaming as described herein.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 6), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 9:
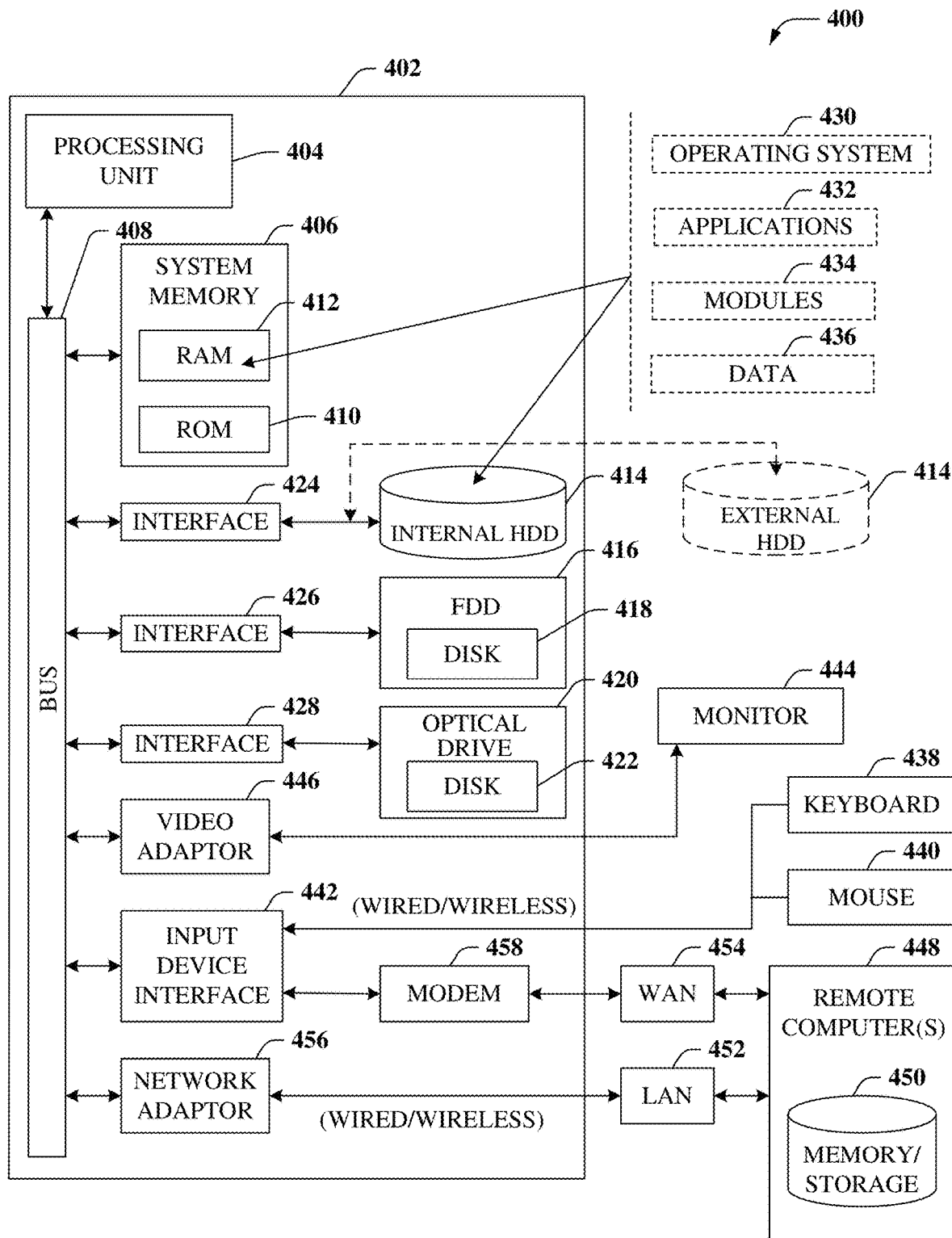
FIG. 9 is a block diagram of an example, non-limiting embodiment of a computing environment in accordance with various aspects described herein.

Turning now to FIG. 9, there is illustrated a block diagram of a computing environment in accordance with various aspects described herein. In order to provide additional context for various embodiments of the embodiments described herein, FIG. 9 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part video streaming as described herein.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 9, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN)

452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 10:
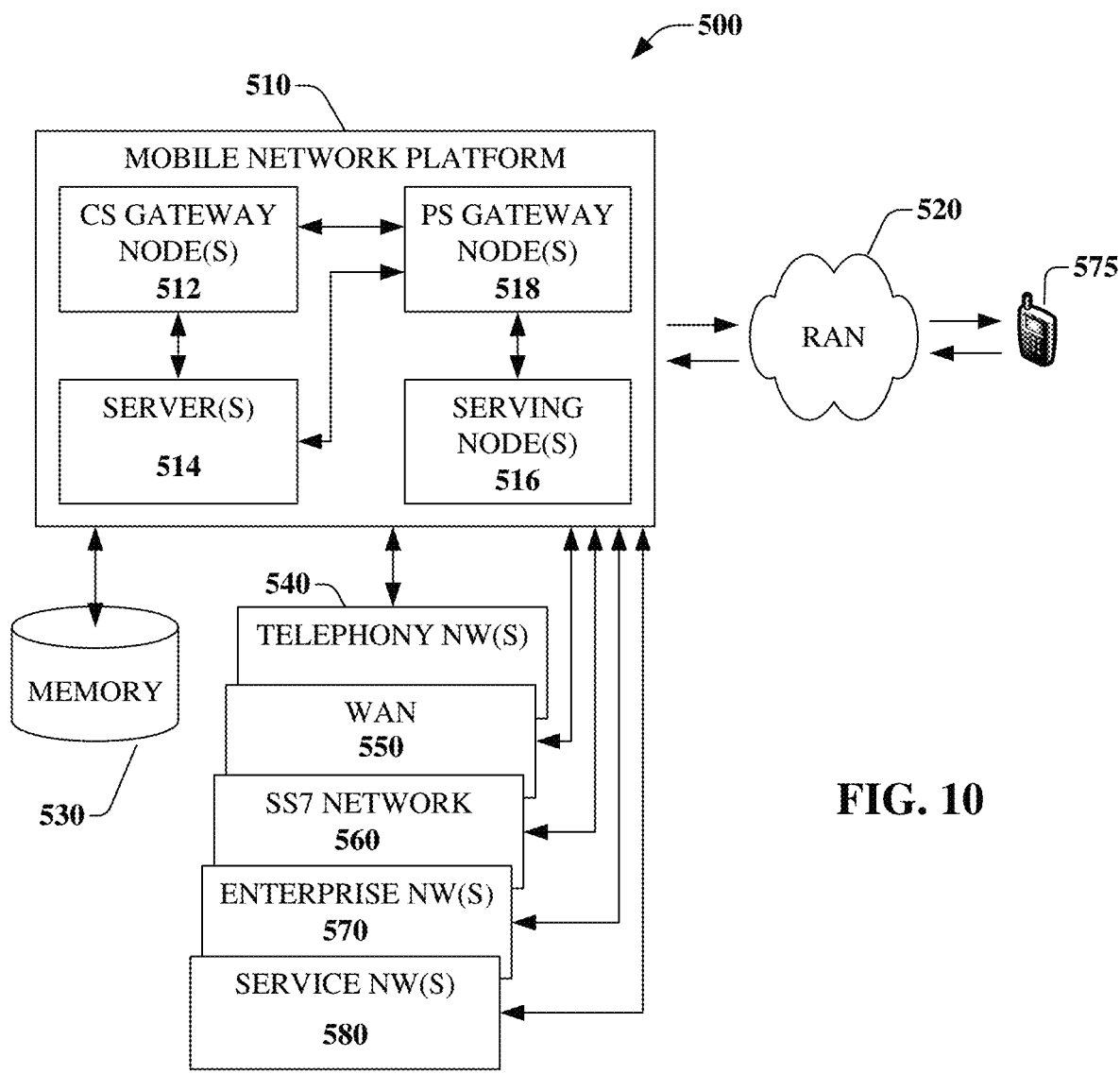
FIG. 10 is a block diagram of an example, non-limiting embodiment of a mobile network platform in accordance with various aspects described herein.

Turning now to FIG. 10, an embodiment 500 of a mobile network platform 510 is shown that is an example of network elements 150, 152, 154, 156, and/or VNEs 330, 332, 334, etc. For example, platform 510 can facilitate in whole or in part video streaming as described herein. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antennas networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 11:
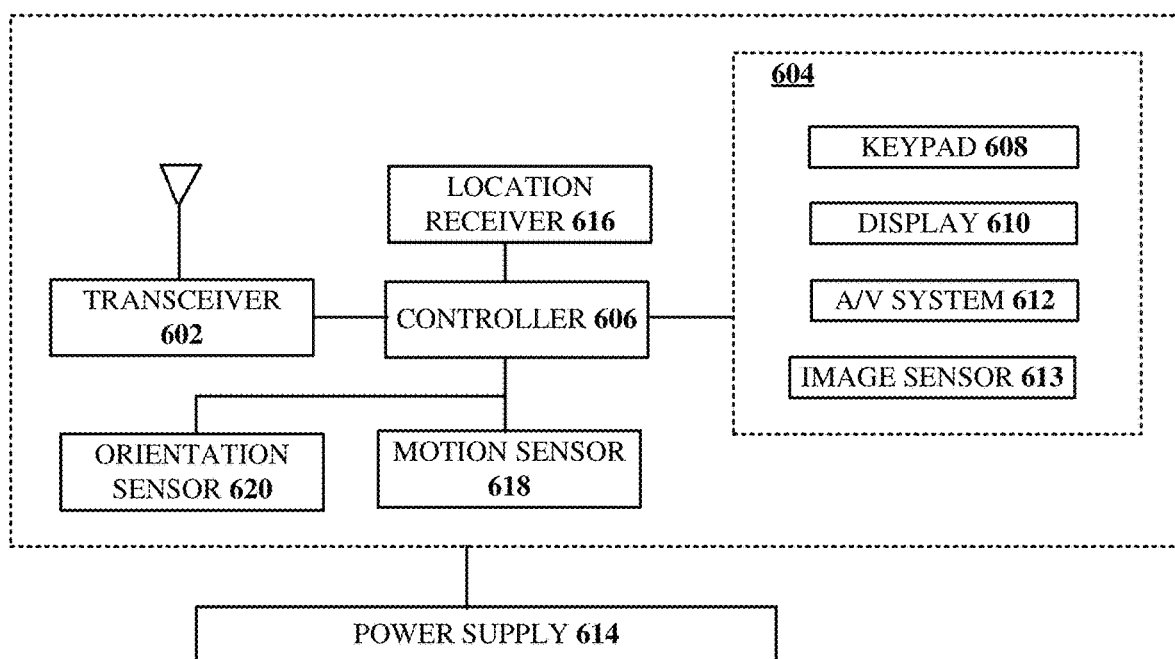
FIG. 11 is a block diagram of an example, non-limiting embodiment of a communication device in accordance with various aspects described herein.

Turning now to FIG. 11, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part video streaming as described herein.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 11 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
    obtaining, by a processing system having a processor, media content, the media content being divided into a plurality of tiles, each tile defining an area of a plurality of areas of the media content for a first time period of a plurality of time periods of the media content;
    obtaining, by the processing system, a ranking for each tile based on a plurality of viewports;
    receiving, by the processing system, a request from an equipment of a user to view the media content;
    obtaining, at a first point in time by the processing system, a first predicted field of view of the user at a second point in time and a second predicted field of view of the user at a third point in time, wherein the second point in time is after the first point in time and the third point in time is after the second point in time;
    identifying, by the processing system, a first viewport of the plurality of viewports corresponding to the second predicted field of view;
    sending, by the processing system, one or more first tiles corresponding to the first predicted field of view to the equipment of the user;
    sending, by the processing system, one or more second tiles corresponding to the second predicted field of view to the equipment of the user according to the ranking based on the first viewport and a first excess bandwidth, the first excess bandwidth remaining after sending the one or more first tiles corresponding to the first predicted field of view;
    obtaining, at the second point in time by the processing system, a third predicted field of view of the user at the third point in time and a fourth predicted field of view of the user at a fourth point in time, wherein the fourth point in time is after the third point in time;
    identifying, by the processing system, a second viewport of the plurality of viewports corresponding to the fourth predicted field of view;
    sending, by the processing system, one or more third tiles corresponding to the third predicted field of view to the equipment of the user; and
    sending, by the processing system, one or more fourth tiles corresponding to the fourth predicted field of view to the equipment of the user according to the ranking based on the second viewport and a second excess bandwidth, the second excess bandwidth remaining after sending the one or more third tiles corresponding to the third predicted field of view.

2. The method of claim 1, wherein multiple field of view predictions are performed periodically according to a second time period less than the first time period.

3. The method of claim 1, wherein the first predicted field of view and the second predicted field of view are received by the processing system from the equipment of the user.

4. The method of claim 1, wherein the first predicted field of view and the second predicted field of view are determined by the processing system based on an actual field of view received from the equipment of the user.

5. The method of claim 1, wherein the processing system obtains a plurality of predicted fields of view periodically according to a second time period, with each of the plurality of predicted fields of view accounts for a third time period, wherein the second time period is shorter than the first time period, wherein the third time period is shorter than the first time period, and wherein the second time period is shorter than the third time period.

6. The method of claim 1, wherein the processing system obtains a plurality of predicted fields of view periodically according to a second time period, with each of the plurality of predicted fields of view accounts for a third time period, wherein the second time period is shorter than the first time period, wherein the third time period is shorter than the first time period, and wherein the third time period is shorter than the second time period.

7. A non-transitory machine-readable storage medium, comprising executable instructions that, when executed by a processing system including a first processor, facilitate performance of operations, comprising:
   obtaining media content from a content source, the media content being divided into a plurality of tiles, each tile defining an area of a plurality of areas of the media content for a first time period of a plurality of time periods of the media content;
   obtaining, from the content source, a ranking for each tile based on a plurality of viewports, each of the plurality of viewports corresponding to a different one of a plurality of fields of view;
   receiving a request from an equipment of a user to view the media content;
   obtaining, at a first point in time, a first predicted field of view of the user at a second point in time and a second predicted field of view of the user at a third point in time, wherein the second point in time is after the first point in time and the third point in time is after the second point in time;
   identifying a first viewport of the plurality of viewports corresponding to the second predicted field of view;
   sending one or more first tiles corresponding to the first predicted field of view to the equipment of the user;
   sending one or more second tiles corresponding to the second predicted field of view to the equipment of the user according to the ranking based on the first viewport and a first excess bandwidth, the first excess bandwidth remaining after sending the one or more first tiles corresponding to the first predicted field of view;
   obtaining, at the second point in time, a third predicted field of view of the user at the third point in time and a fourth predicted field of view of the user at a fourth point in time, wherein the fourth point in time is after the third point in time;
   identifying a second viewport of the plurality of viewports corresponding to the fourth predicted field of view;
   sending one or more third tiles corresponding to the third predicted field of view to the equipment of the user; and
   sending one or more fourth tiles corresponding to the fourth predicted field of view to the equipment of the user according to the ranking based on the second viewport and a second excess bandwidth, the second excess bandwidth remaining after sending the one or more third tiles corresponding to the third predicted field of view.

8. The non-transitory machine-readable storage medium of claim 7, wherein multiple field of view predictions are performed periodically according to a second time period less than the first time period.

9. The non-transitory machine-readable storage medium of claim 7, wherein the first predicted field of view and the second predicted field of view are received by the processing system from the equipment of the user.

10. The non-transitory machine-readable storage medium of claim 7, wherein the first predicted field of view and the second predicted field of view are determined by the processing system based on an actual field of view received from the equipment of the user.

11. A computing device, comprising:
   a processing system including a processor; and
   a memory that stores executable instructions that, when executed by the processing system, facilitate performance of operations, the operations comprising:
      obtaining media content, the media content being divided into a plurality of tiles, each tile defining an area of a plurality of areas of the media content for a first time period of a plurality of time periods of the media content;
      determining a ranking for each tile based on a plurality of viewports, each of the plurality of viewports corresponding to a different one of a plurality of fields of view;
      receiving a request from an equipment of a user to view the media content;
      obtaining, at a first point in time, a first predicted field of view of the user at a second point in time and a second predicted field of view of the user at a third point in time, wherein the second point in time is after the first point in time and the third point in time is after the second point in time;
      identifying a first viewport of the plurality of viewports corresponding to the second predicted field of view;
      sending one or more first tiles corresponding to the first predicted field of view to the equipment of the user;
      sending one or more second tiles corresponding to the second predicted field of view to the equipment of the user according to the ranking based on the first viewport and a first excess bandwidth, the first excess bandwidth remaining after sending the one or more first tiles corresponding to the first predicted field of view;
      obtaining, at the second point in time, a third predicted field of view of the user at the third point in time and a fourth predicted field of view of the user at a fourth point in time, wherein the fourth point in time is after the third point in time;
      identifying a second viewport of the plurality of viewports corresponding to the fourth predicted field of view;
      sending one or more third tiles corresponding to the third predicted field of view to the equipment of the user; and
      sending one or more fourth tiles corresponding to the fourth predicted field of view to the equipment of the user according to the ranking based on the second viewport and a second excess bandwidth, the second excess bandwidth remaining after sending the one or more third tiles corresponding to the third predicted field of view.

12. The computing device of claim 11, wherein multiple field of view predictions are performed periodically according to a second time period less than the first time period.

13. The computing device of claim 11, wherein the first predicted field of view and the second predicted field of view are received by the processing system from the equipment of the user.

14. The computing device of claim 11, wherein the first predicted field of view and the second predicted field of view are determined by the processing system based on an actual field of view received from the equipment of the user.

15. The non-transitory machine-readable storage medium of claim 7, wherein the operations further comprise:

obtaining a plurality of predicted fields of view periodically according to a second time period, with each of the plurality of predicted fields of view accounts for a third time period, wherein the second time period is shorter than the first time period, wherein the third time period is shorter than the first time period, and wherein the second time period is shorter than the third time period.

16. The computing device of claim 11, wherein the operations further comprise:

obtaining a plurality of predicted fields of view periodically according to a second time period, with each of the plurality of predicted fields of view accounts for a third time period, wherein the second time period is shorter than the first time period, wherein the third time period is shorter than the first time period, and wherein the second time period is shorter than the third time period.

17. The computing device of claim 11, wherein the operations further comprise:

obtaining a plurality of predicted fields of view periodically according to a second time period, with each of the plurality of predicted fields of view accounts for a third time period, wherein the second time period is shorter than the first time period, wherein the third time period is shorter than the first time period, and wherein the third time period is shorter than the second time period.

18. The method of claim 1, wherein the first predicted field of view and the second predicted field of view are determined by the processing system based on an actual field of view.

19. The non-transitory machine-readable storage medium of claim 7, wherein the first predicted field of view and the second predicted field of view are determined by the processing system based on an actual field of view.

20. The non-transitory machine-readable storage medium of claim 7, wherein the operations further comprise:

obtaining a plurality of predicted fields of view periodically according to a second time period, with each of the plurality of predicted fields of view accounts for a third time period, wherein the second time period is shorter than the first time period, wherein the third time period is shorter than the first time period, and wherein the third time period is shorter than the second time period.

* * * * *